(12) United States Patent
Hong et al.

(10) Patent No.: US 11,081,765 B2
(45) Date of Patent: Aug. 3, 2021

(54) BATTERY CELL REFILLABLE WITH ELECTROLYTE, BATTERY PACK, ELECTROLYTE REFILLING SYSTEM FOR BATTERY PACK, AND ELECTROLYTE REFILLING METHOD FOR BATTERY PACK

(71) Applicant: LG CHEM, LTD., Seoul (KR)

(72) Inventors: Chul Gi Hong, Seoul (KR); Jae Hyun Lee, Sejong-si (KR); Dong Kyu Kim, Daejeon (KR); Dae Soo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 112 days.

(21) Appl. No.: 16/470,026

(22) PCT Filed: Jan. 23, 2018

(86) PCT No.: PCT/KR2018/001023
§ 371 (c)(1),
(2) Date: Jun. 14, 2019

(87) PCT Pub. No.: WO2018/225926
PCT Pub. Date: Dec. 13, 2018

(65) Prior Publication Data
US 2019/0355960 A1    Nov. 21, 2019

(30) Foreign Application Priority Data

Jun. 7, 2017  (KR) .......................... 10-2017-0070786

(51) Int. Cl.
*H01M 50/609* (2021.01)
*H01M 50/618* (2021.01)
*H01M 50/627* (2021.01)
*H01M 50/673* (2021.01)
*H01M 50/682* (2021.01)
(Continued)

(52) U.S. Cl.
CPC ......... *H01M 50/60* (2021.01); *H01M 50/691* (2021.01); *H01M 2220/20* (2013.01)

(58) Field of Classification Search
None
See application file for complete search history.

(56) References Cited

U.S. PATENT DOCUMENTS 6,106,968 A      8/2000  Johnson et al.
6,355,373 B1 *   3/2002  Pauling ................. H01M 50/70
                                                                429/75
(Continued)

FOREIGN PATENT DOCUMENTS

CN    102320588 A    1/2012
CN    105164831 A    12/2015
(Continued)

OTHER PUBLICATIONS

European Search Report for EP 18 77 9548, dated Apr. 10, 2019.
International Search Report issued in PCT/KR2018/001023 (PCT/ISA/210), dated May 4, 2018.

*Primary Examiner* — Yoshitoshi Takeuchi
(74) *Attorney, Agent, or Firm* — Birch, Stewart, Kolasch & Birch LLP

(57) ABSTRACT

The present invention relates to a battery cell refillable with an electrolyte, an electrolyte refilling system for a battery pack configured to include a plurality of battery cells, and an electrolyte refilling method for a battery pack of an electric vehicle.

12 Claims, 5 Drawing Sheets

(51) Int. Cl.
*H01M 50/60* (2021.01)
*H01M 50/691* (2021.01)
*H01M 10/42* (2006.01)

(56) References Cited

U.S. PATENT DOCUMENTS

| | | | |
|---|---|---|---|
| 9,419,257 B2 | 8/2016 | Lim et al. | |
| 2010/0124691 A1* | 5/2010 | Harris | H01M 10/54 429/50 |
| 2013/0065093 A1 | 3/2013 | White et al. | |
| 2014/0315049 A1 | 10/2014 | Wegner et al. | |
| 2014/0342219 A1 | 11/2014 | Takahashi | |

FOREIGN PATENT DOCUMENTS

| | | | | |
|---|---|---|---|---|
| DE | 196 24 883 C1 | | 7/1997 | |
| GB | 2333888 | * | 4/1999 | H01M 2/40 |
| GB | 2 333 888 A | | 8/1999 | |
| GB | 2333888 | * | 8/1999 | H01M 2/40 |
| GB | 2522395 | * | 7/2015 | H01M 2/36 |
| GB | 2522395 A | | 7/2015 | |
| JP | 2014-212048 A | | 11/2014 | |
| JP | 2014-241283 A | | 12/2014 | |
| KR | 10-1997-0054723 A | | 7/1997 | |
| KR | 20-1998-043358 U | | 9/1998 | |
| KR | 10-0779529 B1 | | 11/2007 | |
| KR | 10-2012-0076878 A | | 7/2012 | |
| KR | 10-2013-0012407 A | | 2/2013 | |
| KR | 10-2014-0103118 A | | 8/2014 | |
| KR | 104134830 | | 11/2014 | |
| KR | 104716293 | | 6/2015 | |
| KR | 10-2016-0032530 A | | 3/2016 | |
| KR | 10-1742980 B1 | | 6/2017 | |
| WO | WO 2011/064009 A1 | | 6/2011 | |

* cited by examiner

[Fig. 1]
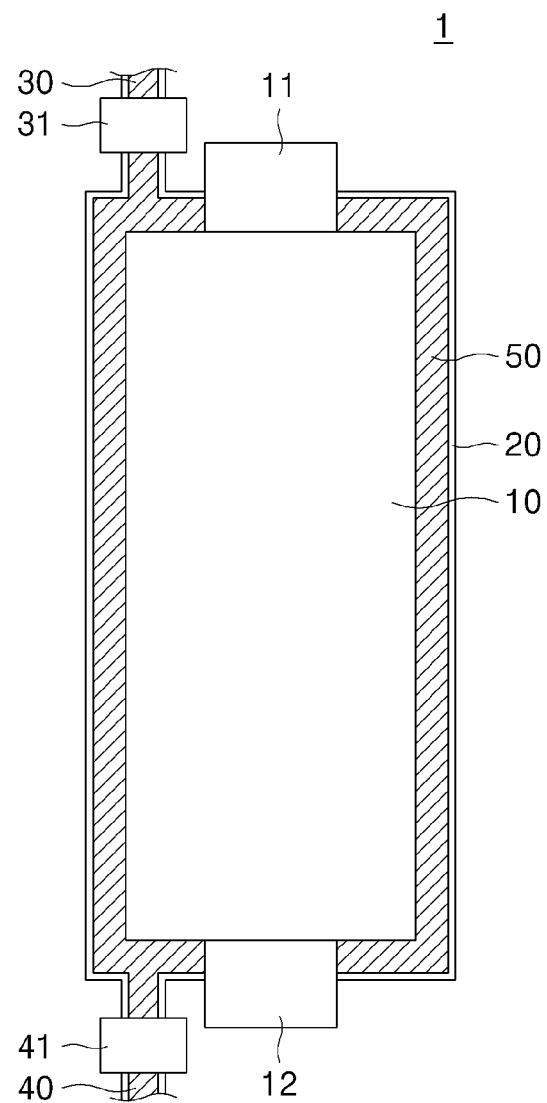

[Fig. 2]
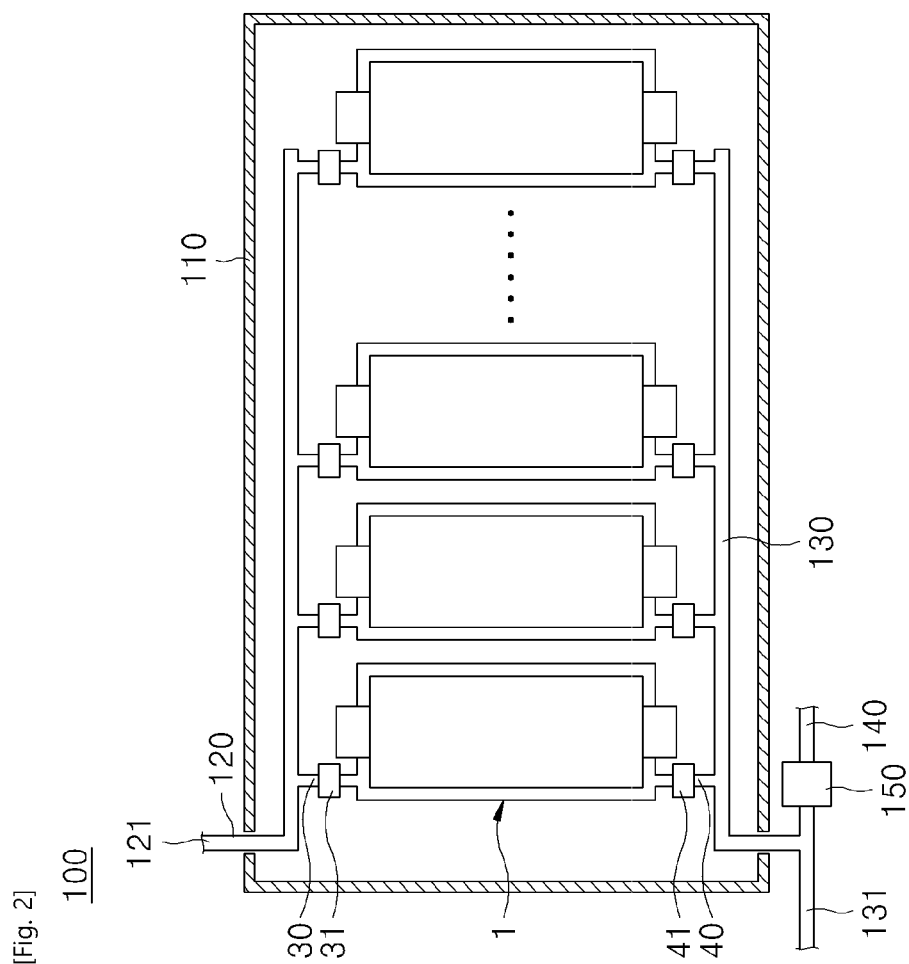

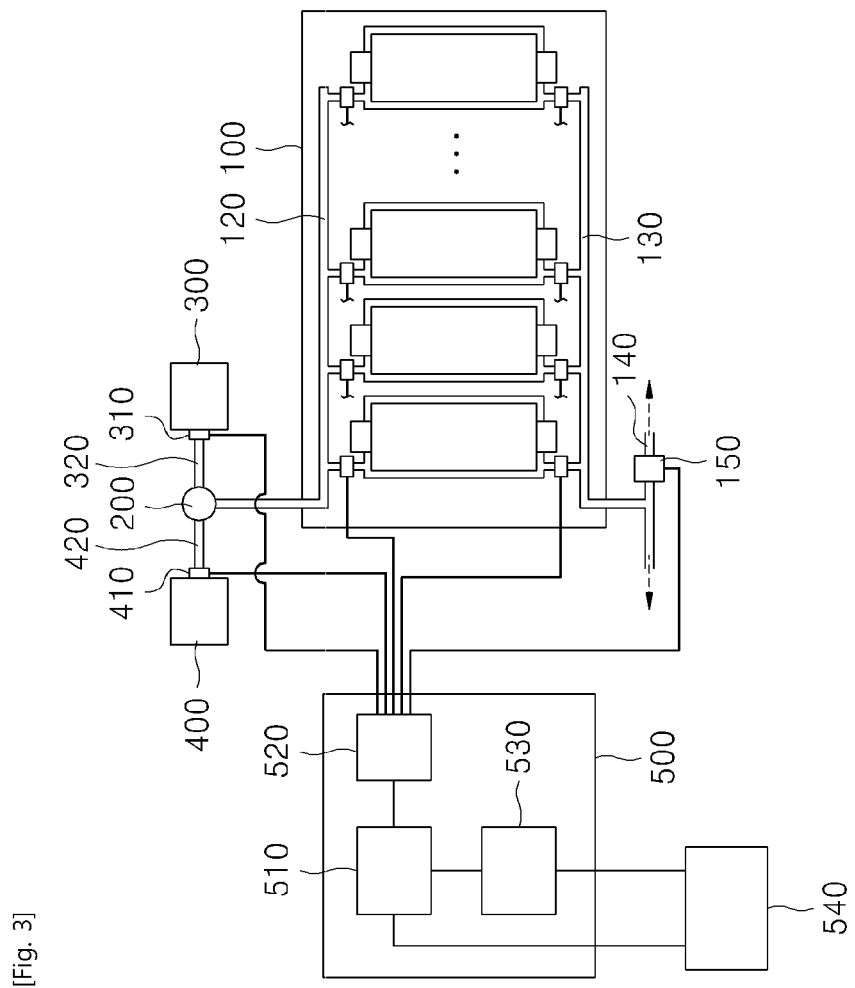
[Fig. 3]

[Fig. 4]
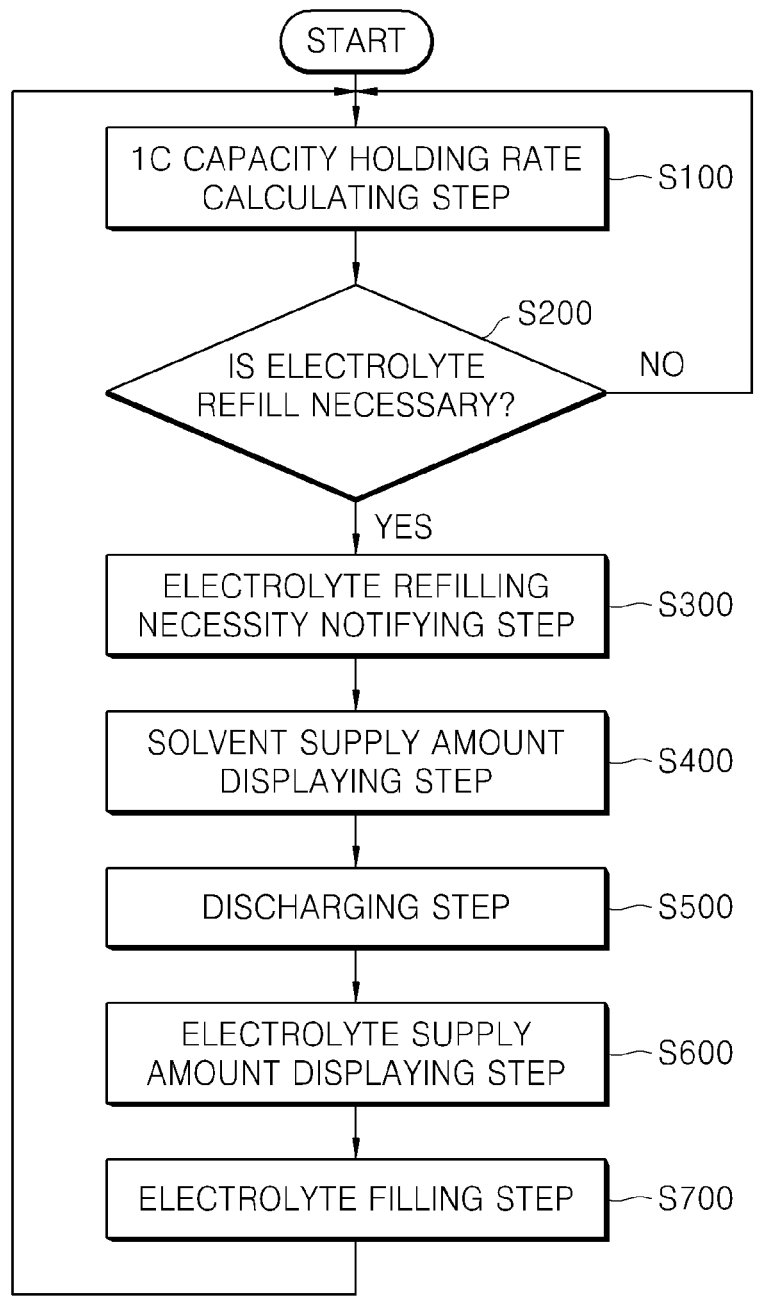

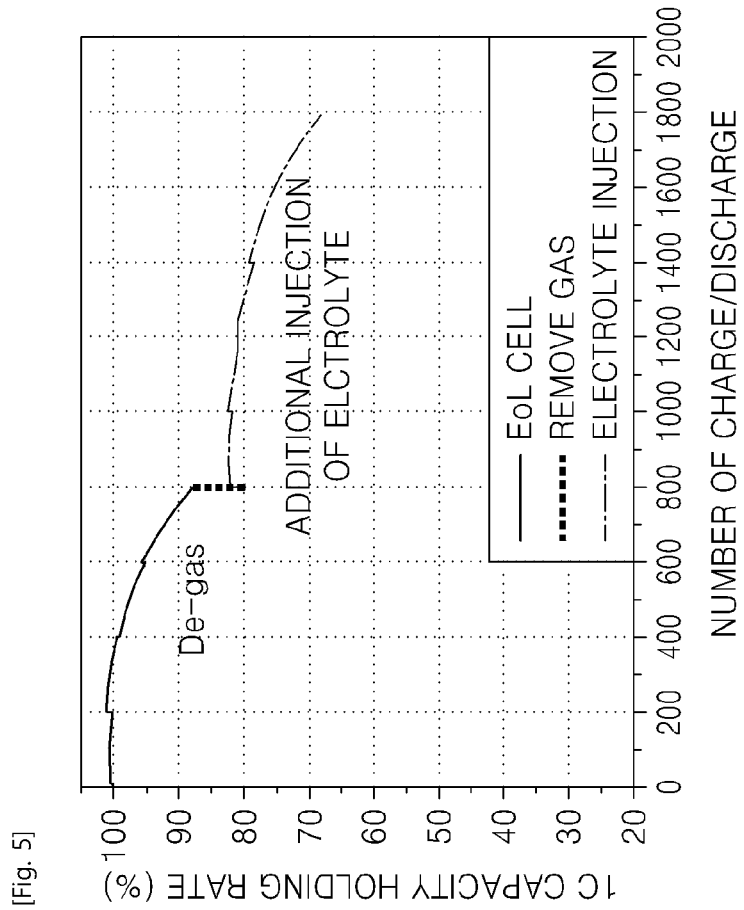
[Fig. 5]

BATTERY CELL REFILLABLE WITH ELECTROLYTE, BATTERY PACK, ELECTROLYTE REFILLING SYSTEM FOR BATTERY PACK, AND ELECTROLYTE REFILLING METHOD FOR BATTERY PACK

TECHNICAL FIELD

The present invention relates to a battery cell refillable with an electrolyte, an electrolyte refilling system for a battery pack configured from a plurality of the battery cells, an electrolyte refilling method for battery packs of electric vehicles.

BACKGROUND ART

In general, secondary batteries refer to batteries, which can be charged/discharged unlike unrechargeable primary batteries, and are being widely used for electronic apparatuses, such as mobile phones, laptop computers, camcorders, or electric vehicles. In particular, since lithium secondary batteries have operating voltages of approximately 3.6 V, capacities of approximately 3 times the capacity of a nickel-cadmium battery or a nickel-hydrogen battery, and high energy densities per unit weight, the use degree of the lithium secondary batteries is explosively increasing.

Such a lithium secondary battery mainly uses a lithium-based oxide and a carbon material as a positive electrode active material and a negative electrode active material, respectively. The lithium secondary battery includes: an electrode assembly which is an assembly of unit cells each having a structure, in which a positive electrode plate and a negative electrode plate, on which a positive electrode active material and a negative electrode active material are respectively applied, are disposed with a separator interposed therebetween; an exterior case for sealing and accommodating the electrode assembly; and an electrolyte with which the electrode assembly is impregnated.

The lithium secondary batteries are classified, according to the shape of the exterior case, into a can-type secondary battery in which the electrode assembly is incorporated into a metal can, and a pouch-type secondary battery in which the electrode assembly is incorporated into a pouch case of a metal laminate sheet.

The pouch-type secondary battery has a merit of having low manufacturing costs, a high energy density, and a merit in that it is easy to configure a large-capacity battery pack through a serial or parallel connection thereof, and thus has recently been spotlighted as an electrical power source for electric vehicles or hybrid vehicles.

The pouch-type secondary battery is manufactured such that an electrode assembly connected with a plate-shaped electrode lead is accommodated in a pouch case, an electrolyte is filled into the pouch case, and the edges of the pouch case are thermally fused. A portion of the electrode lead is exposed to the outside of the pouch case, and the exposed electrode lead is electrically connected to a device on which the secondary battery is mounted, or is used to electrically connect the secondary batteries to each other.

In the secondary batteries, degeneracy of electrolyte occurs according to repeated charge/discharge cycles. Accordingly, the amount of the electrolyte which can contribute to the electrochemical reaction decreases with time, so that the charge/discharge efficiency and the capacity holding rate of the secondary batteries are degraded, and the secondary battery should be replaced or discarded, but the economical loss increases due to excessive costs and as a solution to this limitation, research on reuse have actively been carried out.

Conventional reuse methods include a method in which gas is removed by dismantling a secondary battery to lower the resistance of the secondary battery. However, under a moisture-free environment, an existing method of dismantling the secondary battery and removing gas using vacuum suction is difficult to be actually applied as a reuse method due to a great amount of costs and technical problems.

In addition, although there is another method of filling a predetermined amount of electrolyte to replace a lithium source and adjusting the electrolyte to be suitable for reuse, most existing methods are the methods in which the electrolyte should be filled in the secondary battery by using an expensive apparatus under a controllable environment, and filled by forming a hole in the case of the secondary battery or cutting a cell terrace portion, and is thus difficult to be applied as an actual reuse method.

DISCLOSURE OF THE INVENTION

Technical Problem

The present invention has been devised to solve the above-described limitations, and the purpose thereof is to provide a system and a method for refilling an electrolyte into a battery cell and a battery pack, wherein a side reaction gas may be removed and the electrolyte may be refilled without separating the battery cell.

Another purpose of the present invention is to provide a system and a method for refilling electrolyte into a battery cells and a battery pack, wherein the sealing property or the like of the battery cell constituting a battery pack is not actually degraded even though the refill of the electrolyte has been performed.

Other purposes and merits of the present invention will be described below and understood through exemplary embodiments. In addition, the purposes and merits of the present invention may be achieved by the features set forth in claims and the combinations of the features.

Technical Solution

In accordance with an exemplary embodiment of the present invention, a battery cell refillable with an electrolyte includes: an electrode assembly including a negative electrode plate, a positive electrode plate, and a separator interposed between the negative electrode plate and the positive electrode plate; and a cell accommodating case for accommodating the electrode assembly and an electrolyte, wherein the cell accommodating case has, on one side thereof, a cell filling port including a filling valve, and has, on the other side thereof facing the cell filling port, a cell discharge port comprising a discharge valve.

In accordance with another exemplary embodiment of the present invention, a battery pack refillable with an electrolyte includes: one or more battery cells; a main filling tube for supplying a solvent or an electrolyte to each of the battery cells; a main discharging tube for discharging the solvent or the electrolyte from each battery cell; and an outer case, wherein: the battery cell includes an electrode assembly comprising a negative electrode plate, a positive electrode plate, and a separator interposed between the negative electrode plate and the positive electrode plate, and a cell accommodating case for accommodating the electrode assembly and the electrolyte; the cell accommodating case has, on one side thereof, a cell filling port including a filling valve, and has, on the other side thereof facing the cell filling port, a cell discharge port including a discharge valve; the main filling tube connects the cell filling ports of the battery cells in parallel and allows the solvent and the electrolyte to be supplied to each of the battery cells; the main discharge tube connects the cell discharge ports of the battery cells in parallel and allows the electrolyte inside the battery cells to be discharged to the outside; and the outer case accommodates the one or more battery cells, the main filling tube, and the main discharge tube, and has one side, from which a main filling port of the main filling tube is exposed to the outside, and the other side from which a main discharge port of the main discharge tube is exposed to the outside.

In accordance with still another exemplary embodiment of the present invention, an electrolyte refilling system for a battery pack includes: a plurality of battery cells each including a cell accommodating case configured to accommodate the electrode assembly including a negative electrode plate, a positive electrode plate, and a separator interposed between the negative electrode plate and the positive electrode plate, wherein the cell accommodating case has, on one side thereof, a cell filling port including a filling valve, and has, on the other side thereof facing the cell filling port, a cell discharge port including a discharge valve; a battery pack in which the cell filling port of each battery cell is connected in parallel to each other through a main filling tube, the cell discharge port of each battery cell is connected in parallel to each other through a main discharge tube, the cell filling ports and the cell discharge ports are accommodated in an outer case, and a main filling port of the main filling tube and a main discharge port of the main discharge tube pass through the outer case and are exposed to the outside; a liquid filling pump connected to the main filling port of the main filling tube of the battery pack; a solvent tank including a solvent valve configured to supply or block the solvent supplied to the liquid filling pump; an electrolyte tank including an electrolyte valve configured to supply or block the electrolyte supplied to the liquid filling pump; an electrolyte refilling determining unit configured to calculate a 1C capacity holding rate (%) of the battery pack and determine the necessity of refilling the electrolyte; a supply amount calculating unit configured to calculate amounts of the solvent and electrolyte to be supplied to the solvent tank and the electrolyte tank; a control unit configured to control, according to the determination of the necessity of refilling the electrolyte from the electrolyte refilling determining unit, the filling valve, the discharge valve, the liquid filling pump, the solvent valve, and the electrolyte valve so as to supply the calculated amounts of solvent and electrolyte to each battery cell constituting the battery pack; and a notifying unit configured to notify a user of the necessity of refilling the electrolyte and the calculated amounts of solvent and electrolyte.

The battery pack may further include a gas discharge tube on one side of the main discharge tube, wherein the gas discharge tube may further include a gas amount measuring apparatus.

The gas amount measuring apparatus may measure and transmit, to the supply amount calculating unit, an amount of gas discharged through the main discharge tube.

The 1C capacity holding rate (%) may be calculated by Equation 1 below.

$$1C \text{ capacity holding rate } (\%) = \frac{\text{Current } 1C \text{ discharge capacity}}{\text{Initial } 1C \text{ discharge capacity}} \times 100 \quad \text{(Equation 1)}$$

In Equation 1, the initial 1C discharge capacity is a discharge capacity calculated when the battery pack has been manufactured, and the current 1C discharge capacity is a discharge capacity of the battery pack in use.

The supply amount calculating unit may calculate a solvent supply amount as approximately 100% to approximately 150% of an amount of electrolyte having already been filled into the battery pack.

The supply amount calculating unit may measure an amount of gas discharged to the main discharge tube, calculate, on the basis of the measured amount of gas, an amount (A) of the electrolyte which has already been injected and converted into a reaction by-product due to a chemical reaction with the electrode assembly, and calculate an electrolyte supply amount by using Equation 2 below.

$$\text{Electrolyte supply amount (ml)} = \text{Already filled electrolyte amount (ml)} - A(\text{ml}) \quad \text{(Equation 2)}$$

When the electrolyte refilling determining unit determines the refill of the electrolyte, the control unit may open the filling valves and the discharge valves of the battery cells so that a solvent supplied to the solvent tank is filled into each battery cell by the liquid filling pump and the electrolyte inside the battery cell is thereby discharged; when the solvent is completely filled, the control unit may close the discharge valves of the battery cells and the solvent valve of the solvent tank and open the electrolyte valve of the electrolyte tank so that the electrolyte supplied to the electrolyte tank by the liquid filling pump is filled into each battery cell and the solvent is thereby discharged; and when the electrolyte is completely filled, the control unit may close the filling valves of the battery cells and the electrolyte valve of the electrolyte tank.

The notifying unit may further include a visual display unit configured to display the necessity of refilling the electrolyte, and supply amounts of the solvent and the electrolyte.

In accordance with yet another exemplary embodiment of the present invention, a method of replacing an electrolyte in a battery pack for an electric vehicle includes: a 1C capacity holding rate calculating step of calculating a 1C capacity holding rate (%) of a battery pack in use; an electrolyte refilling necessity determining step wherein when the 1C capacity holding rate (%) calculated in the 1C capacity holding rate calculating step has been calculated as a predetermined percent (%) or less, the necessity of refilling the electrolyte is determined; an electrolyte refilling necessity notifying step wherein the necessity of refilling the electrolyte is notified to a user; a solvent supply amount displaying step wherein an amount of solvent to be supplied to a solvent tank is displayed to the user; a discharging step wherein the solvent supplied to the solvent tank is filled into each of battery cells constituting the battery pack, and an electrolyte and a reaction gas inside each battery cell are discharged to the outside; an electrolyte supply amount displaying step wherein an amount of electrolyte to be supplied to an electrolyte tank is displayed to the user; and an electrolyte filling step wherein the electrolyte supplied to the electrolyte tank is filled into each of the battery cells constituting the battery pack.

The 1C capacity holding rate (%) may be calculated by Equation 1 below.

$$1C \text{ capacity holding rate } (\%) = \frac{\text{Current } 1C \text{ discharge capacity}}{\text{Initial } 1C \text{ discharge capacity}} \times 100 \quad \text{(Equation 1)}$$

In Equation 1, the initial 1C discharge capacity is a discharge capacity calculated when the battery pack has been manufactured, and the current 1C discharge capacity is a discharge capacity of the battery pack in use.

The solvent supply amount may be calculated as approximately 100% to approximately 150% of an amount of electrolyte having already been filled into the battery pack.

The electrolyte supply amount may be calculated by using Equation 2 below such that an amount of gas discharged to the outside of the battery pack is measured, and on the basis of the measured amount of gas, an amount (A) of electrolyte which has already been filled and converted into a reaction by-product due to a chemical reaction with an electrode assembly, is calculated.

$$\text{Electrolyte supply amount (ml)} = \text{Already filled electrolyte amount (ml)} - A \text{ (ml)} \quad \text{(Equation 2)}$$

Advantageous Effects

In accordance with an aspect of the present invention, the service life of a battery pack may be extended by discharging an electrolyte of a battery pack having a decreased capacity holding rate (%) and refilling a new electrolyte in the battery pack.

In accordance with another aspect of the present invention, it becomes possible to precisely determine the required amount of electrolyte without dismantling a battery cell and discharge a reaction gas generated inside the battery cell.

BRIEF DESCRIPTION OF THE DRAWINGS

FIG. 1 is a cross-sectional view illustrating a cross-section of a battery cell refillable with an electrolyte in accordance with an exemplary embodiment of the present invention.

FIG. 2 schematically illustrates a cross-section of a battery pack in accordance with an exemplary embodiment of the present invention.

FIG. 3 schematically illustrates an electrolyte refilling system for a battery pack in accordance with an exemplary embodiment of the present invention.

FIG. 4 is a flowchart illustrating an electrolyte refilling method for a battery pack in accordance with an exemplary embodiment of the present invention.

FIG. 5 is a graph illustrating a change in capacity holding rate (%) of a battery pack in accordance with an exemplary embodiment of the present invention.

MODE FOR CARRYING OUT THE INVENTION

It should be understood that words or terms used in the specification and claims shall not be interpreted as limited to general and dictionary meanings, but interpreted based on the meanings and concepts consistent with the technical aspects of the invention on the basis of the principle that the inventor may appropriately define the terms for the best explanation.

Therefore, the features of the embodiments and drawings described herein are merely the most preferable exemplary embodiment for the purpose of illustrations only, not intended to represent all the technical concepts of the present invention, so it should be understood that various modifications and equivalents could be made thereto at the time of present application. Moreover, detailed description related to well-known arts or the like will be ruled out in order not to unnecessarily obscure subject matters of the present invention.

FIG. 1 is a cross-sectional view illustrating a battery cell refillable with an electrolyte in accordance with an exemplary embodiment of the present invention.

Referring to FIG. 1, a battery cell 1 of the present invention includes an electrode assembly 10 and a cell accommodating case 20 which accommodates the electrode assembly 10 and an electrolyte 50, and the cell accommodating case 20 may be configured to include a cell filling port 30 including a filling valve 31 and a cell discharge port 40 including a discharging valve 41.

The electrode assembly 10 is configured from an assembly of unit cells (not shown). The unit cell includes a positive electrode plate (not shown) on which a positive electrode active material is applied, a negative electrode plate (not shown) on which a negative electrode active material is applied, and a separator (not shown) which electrically separates the positive electrode plate and the negative electrode plate. The positive electrode active material and the negative electrode active material may be applied to coat any one surface or both surfaces of the positive electrode and the negative electrode. A separator for electrical insulation may be interposed between the unit cells adjacent to each other. The unit cell may have both a bi-cell structure, in which the polarities of the outermost electrodes are the same, and a full-cell structure, in which the polarities of the outermost electrodes are opposite to each other.

The electrode assembly may have various structures according to a stacking method of unit cells. That is, the electrode assembly may have a simple stack structure, a stack/folding type structure, a jelly-roll structure, or the like. The simple stack structure refers to a structure in which a plurality of unit cells are sequentially stacked. In addition, the stack/folding-type structure refers to a structure in which a plurality of unit cells are disposed at regular intervals on a band-shaped separator, and then wound in any one direction such that the unit cells are inserted between the folded separator sections. In addition, the jelly-roll structure is a structure in which unit cells are formed in band shapes, and then the unit cells are wound in a certain direction.

The electrode assembly 10 is provided with electrode tabs 11 and 12 extending from electrode plates of the unit cell. The electrode tabs 11 and 12 have polarities opposite to each other. The electrode tabs 11 and 12 may have structures extending from the positive electrode plate or the negative electrode plate which constitutes a unit cell. Alternatively, the electrode tabs 11 and 12 may have structures in which a metal piece is jointed to the positive electrode plate or the negative electrode plate. Electrode leads (not shown) are jointed to the electrode tabs 11 and 12 by welding or a conductive adhesive and thus electrically connected to the electrode assembly.

The electrode assembly 10 is sealed in the cell accommodating case through an electrolyte filling step and a thermal fusion step. The cell accommodating case may have a structure in which an insulating polymer is laminated on the upper and lower surfaces of a metal thin film. The metal thin film prevents external moisture, gas, and the like from penetrating into the electrode assembly side, improves the mechanical strength of the cell accommodating case, and prevents chemical materials filled into the cell accommodating case from leaking to the outside. The metal thin film may be provided by using any one selected from an alloy of iron, carbon, chromium and manganese, an alloy of iron, chromium, and nickel, aluminum, or an equivalent thereof, but exemplary embodiments are not limited thereto. When a material including iron is used for the metal thin film, mechanical strength is increased, and when a material including aluminum is used, flexibility is enhanced. In general, an aluminum metal foil is favorably used.

A pouch-type cell accommodating case is described in this description, but exemplary embodiments are not limited thereto, and any material which can accommodate the electrode assembly, maintain the shape thereof, and protect the electrode assembly from external force may be used.

The cell accommodating case 20 is provided with a recess groove (not shown) corresponding to the shape of the electrode assembly so that the electrode assembly 10 may be mounted thereon. The recess groove may be omitted if necessary.

The cell accommodating case 20 has, on one side thereof, in which the electrode tabs 11 and 12 are provided, a cell filling port 30 through which an electrolyte 50 is filled, and has, on the other side thereof, a cell discharge port 40 from which the electrolyte is discharged.

In addition, the cell filling port 30 and the cell discharge port 40 respectively include a filling valve 31 and a discharge valve 41, and thus, while the filling valve 31 and the discharge valve 41 are closed, the cell accommodating case 20 is sealed and the electrolyte 50 may be prevented from leaking to the outside.

Accordingly, in the battery cell 1 refillable with an electrolyte in accordance with the exemplary embodiment, when a new electrolyte is injected through the cell filling port 30 according to opening/closing of the filling valve 31 and the discharge valve 41, the electrolyte 50 having already been injected is discharged from the cell discharge port 40, and thus, the electrolyte of the battery cell 1 may be replaced.

FIG. 2 schematically illustrates a cross-section of a battery pack 100 including a plurality of battery cells 1 with refillable electrolytes in accordance with an exemplary embodiment of the present invention, and FIG. 3 schematically illustrates an electrolyte refilling system for a battery pack in accordance with an exemplary embodiment of the present invention.

Referring to FIGS. 2 and 3, a battery pack 100 in accordance with an exemplary embodiment of the present invention includes: one or more battery cells 1; and an outer case 110 accommodating therein a main filling tube 120 and main discharge tube 130.

In addition, the battery pack 100 may be configured such that a cell filling port of each of the battery cells 1 is connected in parallel to the main filling tube 120, and a cell discharge port 40 of each battery cell 1 is connected in parallel to the main discharge tube 130.

Accordingly, a solvent or an electrolyte supplied to the main filling tube 120 may be supplied to each battery cell, and the solvent or the electrolyte discharged from each battery cell is discharged to the main discharge tube 130.

In addition, a main filling port 121 of the main filling tube 120 and a main discharge port 131 of the main discharge tube 130 are configured to pass through the outer case 110 and be exposed to the outside.

The main discharge tube 130 may be configured to further have, on one side thereof, a gas discharge tube 140.

In addition, the gas discharge tube 140 is provide with a gas amount measuring unit 150 which measures the amount of gas discharged from the main discharge tube 130.

An electrolyte refilling system for a battery pack in accordance with an exemplary embodiment includes: a battery pack 100; a liquid filling pump 200; a solvent tank 300; an electrolyte tank 400; an electrolyte refilling determining unit 510; a supply amount calculating unit 530; a control unit 520 for controlling the filling valve 31 and the discharge valve 41 of each of the battery cells, the liquid filling pump 200, a solvent valve 310, and an electrolyte valve 410; and a notifying unit 540 for notifying a user of necessity of refilling the electrolyte and the amounts of solvent and electrolyte that should be supplied.

In the battery pack 100, the main filling port 121 is connected to the liquid filling pump 200, and the liquid filling pump 200 supplies the main filling tube 120 with the solvent and the electrolyte of the solvent tank 300 and the electrolyte tank 400.

In addition, the main discharge tube 130 of the battery pack 100 further has, on one side thereof, a gas discharge tube 140, and the gas discharge tube 140 has a gas amount measuring unit 150 attached thereto, so that the gas discharged to the main discharge tube 130 is allowed to be discharged to the gas discharge tube 140 and the gas amount measuring unit 150 measures the amount of the gas and transmits the measuring results to the supply amount calculating unit 530.

The operation of the liquid filling pump 200 is controlled by the control unit 520 to be described later, and it is preferable that the solvent and the electrolyte may be filled into the main filling tube 120 while the pressure is set within a range from approximately 1.5 kgf/cm$^2$ to approximately 2.2 kgf/cm$^2$ to inject the solvent and the electrolyte to each battery cell 1 constituting the battery back 100, but exemplary embodiments are not limited thereto.

The solvent tank 300 is configured to include a solvent valve 310 the opening/closing of which is controlled by the control unit 520, and a solvent supply tube 320 is connected to the liquid filling pump 200.

In addition, the electrolyte tank 400 is configured to include an electrolyte valve 410 the opening/closing of which is controlled by the control unit 520, and an electrolyte supply tube 420 is connected to the liquid filling pump 200.

The electrolyte refilling determining unit 510, the supply amount calculating unit 530, and the control unit, which are to be described below, may be configured to include a battery management system (BMS) or modularized to be attached to the outside of the battery pack 100.

The battery management system (BMS) controls the charge/discharge of the battery pack 100, collects the state information such as the state, the temperature, the charging current and discharging current, and thereby manages the battery pack 100.

The electrolyte refilling determining unit 510 calculates the 1C capacity holding rate (%) of the battery pack 100 and thereby determines the necessity of electrolyte refilling of the battery pack 100, and the 1C capacity holding rate (%) may be calculated by Equation 1.

$$1C \text{ capacity holding rate } (\%) = \frac{\text{Current } 1C \text{ discharge capacity}}{\text{Initial } 1C \text{ discharge capacity}} \times 100 \quad \text{(Equation 1)}$$

In Equation 1, the initial 1C discharge capacity is the discharge capacity when the battery pack 100 has been manufactured, and the current 1C discharge capacity is the 1C discharge capacity of the battery pack 100 in use.

The discharge capacity is a unit for predicting or indicating the usable time of the battery pack 100, and may be obtained by measuring the value of discharging current and calculating the capacity of the battery pack 100. That is, the 1C discharging capacity indicates the capacity of the battery pack 100 due to discharging current for 1 hour.

The initial 1C discharging capacity may be calculated before the battery pack 100 is manufactured and used, and the current discharging capacity may be calculated by using a current value managed by the battery management system (BMS).

In the electrolyte refilling determining unit 510, when the 1C capacity holding rate (%) generated by (Equation 1) is calculated to be approximately 70% to approximately 80%, it is preferable to determine the necessity of refilling the electrolyte of the battery pack 100, but the setting of the range is not limited thereto, and may be modified if necessary in manufacturing a battery.

The supply amount calculating unit 530 calculates the amounts of solvent and electrolyte which are to be filled into the battery pack 100 when the electrolyte refilling determining unit 510 has determined the time for refilling the electrolyte.

In addition, the amounts of solvent and the electrolyte which are calculated from the supply amount calculating unit 530 are transmitted to the notifying unit.

The amount of the solvent is calculated as approximately 100% to approximately 150% of the amount of electrolyte having already been injected on the basis of the amount of the electrolyte having already been filled into the battery pack 100. This is to discharge the entire electrolyte having already been filled by supplying a sufficient amount of solvent to the battery cells 1 constituting the battery pack 100.

The solvent functions to discharge a reaction gas together with the electrolyte and clean by-products which may be attached to the electrode assembly while being filled into each battery cell 1 constituting the battery pack 100.

In addition, the supply amount calculating unit 530 calculates the amount A of the electrolyte which has already been injected and is converted into the by-product through a chemical reaction with the electrode assembly 10 through the amount of gas measured from the gas amount measuring unit 150 of the battery pack 100, and calculates the electrolyte supply amount by Equation 2 below.

Electrolyte supply amount (ml)=Already filled electrolyte amount (ml)-$A$ (ml)   (Equation 2)

Accordingly, the electrolyte may be supplied by the amount required from the battery pack 100.

When the electrolyte refilling determining unit 510 has determined the refilling of the electrolyte, the control unit 520 opens the filling valves 31 and the discharge valves 41 of the battery cells 1 and the solvent valve 310 of the solvent tank 300 to allow the solvent, supplied to the solvent tank 300 via the main filling tube 120 by the liquid filling pump 200, to be filled into each battery cell 1 and allow the electrolyte inside the battery cell 1 to be discharged. When the solvent is completely filled, the control unit 520 closes the discharge valves 41 of the battery cells 1 and the solvent valve 310 of the solvent tank 300 and opens the electrolyte valve 410 of the electrolyte tank 400, so that the electrolyte supplied to the electrolyte tank 400 via the main filling tube 120 by the liquid filling pump 200 is allowed to be filled into each battery cell 1 and the solvent is allowed to be dis-charged. In addition, when the electrolyte is completely filled, the control unit 520 closes the filling valves 31 of the battery cells 1 and the electrolyte valve 410 of the electrolyte tank 400 to allow the air-tightness of the battery cell 1 to be maintained.

The notifying unit 540 has a function to notify a user of the necessity of refilling the electrolyte which has been determined from the electrolyte refilling determining unit 510 and the amount of solvents and electrolyte calculated from the supplying amount calculating unit 530, and further includes a visual display, so that the notification may be visually provided to the user.

FIG. 4 is a flowchart illustrating an electrolyte refilling method for a battery pack in accordance with an exemplary embodiment, and FIG. 5 is a graph illustrating a change in 1C capacity holding rate (%) of a battery pack in accordance with an exemplary embodiment.

Referring to FIG. 4, an electrolyte refilling method for a battery pack in accordance with an exemplary embodiment may be configured to include: a 1C capacity holding rate (%) calculating step (S100); an electrolyte refilling necessity determining step (S200); an electrolyte refilling necessity notifying step (S300); a solvent supply amount displaying step (S400); a discharging step (S500); an electrolyte supply amount displaying step (S600); and an electrolyte filling step (S700).

The 1C capacity holding rate (%) calculating step (S100) may be performed by using Equation 1 below.

$$1C \text{ capacity holding rate } (\%) = \frac{\text{Current } 1C \text{ discharge capacity}}{\text{Initial } 1C \text{ discharge capacity}} \times 100 \quad \text{(Equation 1)}$$

In Equation 1, the initial 1C discharge capacity is the discharge capacity calculated when a battery pack has been manufactured, and the current 1C discharge capacity is the value calculated from the battery management system (BMS) of the battery pack in use.

In the electrolyte refilling necessity determining step (S200), when the 1C capacity holding rate calculated in step 100 above is calculated as a predetermined percent (%) or less, the necessity of refilling the electrolyte is determined. The predetermined percent (%) may be set in a step of designing the battery pack, and may be changed and set according to the use of a battery.

In the electrolyte refilling necessity notifying step (S300), when the necessity of refilling of the electrolyte of the battery pack is determined in step S200 above, a user is notified of the necessity of the electrolyte refill by a notification sound or by displaying the notification on a visual display unit.

In the solvent supply amount displaying step (S400), the amount of supplying the solvent is calculated as approximately 100% to approximately 150% of the electrolyte having already been injected on the basis of the amount of the electrolyte having already been filled into the battery pack, and the solvent supply amount is displayed to the user.

In the discharging step (S500), when the amount of solvent calculated in step S400 above is supplied, the liquid filling pump is operated and the solvent is filled into the battery cells constituting the battery pack.

At this point, the electrolytes inside the battery cells are discharged to the outside due to the pressure of the solvent injected by the liquid filling pump, and a reaction gas generated by a chemical reaction of the electrode assembly and the electrolytes inside the battery cells is also discharged to the outside.

In the electrolyte supply amount displaying step (S600), the amount of the reaction gas is measured from among the electrolytes and the reaction gas, which are discharged to the outside due to the filled solvent in step S500 above, and the amount A of the electrolyte, which has already been injected and is converted into a reaction by-product of a chemical reaction between the electrolyte and the electrode assembly is calculated, and thus, the electrolyte supply amount calculated by Equation 2 below is displayed to the user.

Electrolyte supply amount (ml)=Already filled electrolyte amount (ml)−$A$ (ml)  (Equation 2)

In the electrolyte supplying step (S700), when the electrolyte calculated in step S600 above is supplied, the liquid filling pump is operated and the electrolyte is filled into the battery cells constituting the battery pack.

FIG. 5 is a graph illustrating a change in the 1C capacity holding rate (%) of a battery pack when the electrolyte of the battery pack is refilled in accordance with an exemplary embodiment of the present invention.

Referring to FIG. 5, it may be understood that when the number of charge/discharge increases according to the use of a battery pack, the 1C capacity holding rate (%) gradually decreases, and the usable time of the battery pack decreases.

In addition, it may be understood that when the electrolyte of the battery pack is refilled, the width of decrease in the 1C capacity holding rate (%) according to the number of charge/discharge is reduced. Accordingly, the service life of the battery pack may be extended due to the refill of the electrolyte in accordance with an exemplary embodiment.

As described so far, an electrolyte may be replaced without dismantling a battery cell constituting a battery pack, by using a battery cell refillable with an electrolyte, a battery pack, an electrolyte refilling system for the battery pack, and an electrolyte refilling method for the battery pack in accordance with exemplary embodiment; and a reaction gas generated due to the use of the battery pack may also be discharged to the outside.

What is claimed is:

1. An electrolyte refilling system for a battery pack comprising:
   (1) a plurality of battery cells each comprising a cell accommodating case configured to accommodate an electrode assembly comprising a negative electrode plate, a positive electrode plate, and a separator interposed between the negative electrode plate and the positive electrode plate,
      wherein the cell accommodating case has, on one side thereof, a cell filling port comprising a filling valve, and has, on the other side thereof facing the cell filling port, a cell discharge port comprising a discharge valve;
   (2) a battery pack in which the cell filling port of each battery cell is connected in parallel to each other through a main filling tube,
      the cell discharge port of each battery cell is connected in parallel to each other through a main discharge tube,
      the cell filling ports and the cell discharge ports are accommodated in an outer case, and a main filling port of the main filling tube and a main discharge port of the main discharge tube pass through the outer case and are exposed to the outside;
   (3) a liquid filling pump connected to the main filling port of the main filling tube of the battery pack;
   (4) a solvent tank comprising a solvent valve configured to supply or block the solvent supplied to the liquid filling pump;
   (5) an electrolyte tank comprising an electrolyte valve configured to supply or block the electrolyte supplied to the liquid filling pump;
   (6) an electrolyte refilling determining unit configured to calculate a 1C capacity holding rate (%) of the battery pack and determine a necessity of refilling the electrolyte;
   (7) a supply amount calculating unit configured to calculate amounts of the solvent and electrolyte to be supplied to the solvent tank and the electrolyte tank;
   (8) a control unit configured to control, according to the determination of the necessity of refilling the electrolyte from the electrolyte refilling determining unit, the filling valve, the discharge valve, the liquid filling pump, the solvent valve, and the electrolyte valve so as to supply the calculated amounts of solvent and electrolyte to each battery cell constituting the battery pack; and
   (9) a notifying unit configured to notify a user of the necessity of refilling the electrolyte and the calculated amounts of solvent and electrolyte.

2. The electrolyte refilling system of claim 1, wherein the battery pack further comprises a gas discharge tube on one side of the main discharge tube, wherein the gas discharge tube further comprising a gas amount measuring apparatus.

3. The electrolyte refilling system of claim 2, wherein the gas amount measuring apparatus measures and transmits, to the supply amount calculating unit, an amount of gas discharged through the main discharge tube.

4. The electrolyte refilling system of claim 1, wherein the 1C capacity holding rate (%) is calculated by Equation 1 below:

$$1C \text{ capacity holding rate } (\%) = \frac{\text{Current } 1C \text{ discharge capacity}}{\text{Initial } 1C \text{ discharge capacity}} \times 100 \quad \text{(Equation 1)}$$

in Equation 1, the initial 1C discharge capacity is a discharge capacity calculated when the battery pack has been manufactured, and the current 1C discharge capacity is a discharge capacity of the battery pack in use.

5. The electrolyte refilling system of claim 1, wherein the supply amount calculating unit calculates a solvent supply amount as approximately 100% to approximately 150% of an amount of electrolyte having already been filled into the battery pack.

6. The electrolyte refilling system of claim 1, wherein the supply amount calculating unit
   measures an amount of gas discharged to the main discharge tube,
   calculates, on the basis of the measured amount of gas, an amount (A) of electrolyte which has been already injected and converted into a reaction by-product due to a chemical reaction with the electrode assembly, and
   calculates an electrolyte supply amount by using Equation 2 below Electrolyte supply amount (ml)=Already filled electrolyte amount (ml)−$A$ (ml).  (Equation 2)

7. The electrolyte refilling system of claim 1, wherein
when the electrolyte refilling determining unit determines the refill of the electrolyte, the control unit opens the filling valves and the discharge valves of the battery cells so that a solvent supplied to the solvent tank is filled into each battery cell by the liquid filling pump and the electrolyte inside the battery cell is thereby discharged;
when the solvent is completely filled, the control unit closes the discharge valves of the battery cells and the solvent valve of the solvent tank and opens the electrolyte valve of the electrolyte tank so that the electrolyte supplied to the electrolyte tank by the liquid filling pump is filled into each battery cell and the solvent is thereby discharged; and
when the electrolyte is completely filled, the control unit closes the filling valves of the battery cells and the electrolyte valve of the electrolyte tank.

8. The electrolyte refilling system of claim 1, wherein the notifying unit further comprises a visual display unit configured to display the necessity of refilling the electrolyte, and supply amounts of the solvent and the electrolyte.

9. A method of refilling an electrolyte in a battery pack for an electric vehicle, comprising:
a 1C capacity holding rate calculating step of calculating a 1C capacity holding rate (%) of a battery pack in use;
an electrolyte refilling necessity determining step wherein when the 1C capacity holding rate (%) calculated in the 1C capacity holding rate calculating step has been calculated as a predetermined percent (%) or less, the necessity of refilling the electrolyte is determined;
an electrolyte refilling necessity notifying step wherein the necessity of refilling the electrolyte is notified to a user;
a solvent supply amount displaying step wherein an amount of solvent to be supplied to a solvent tank is displayed to the user;
a discharging step wherein the solvent supplied to the solvent tank is filled into each of battery cells constituting the battery pack, and an electrolyte and a reaction gas inside each battery cell are discharged to the outside;
an electrolyte supply amount displaying step wherein an amount of electrolyte to be supplied to an electrolyte tank is displayed to the user; and
an electrolyte filling step wherein the electrolyte supplied to the electrolyte tank is filled into each of the battery cells constituting the battery pack.

10. The method of claim 9, wherein the 1C capacity holding rate (%) is calculated by Equation 1 below.

$$1C \text{ capacity holding rate } (\%) = \frac{\text{Current } 1C \text{ discharge capacity}}{\text{Initial } 1C \text{ discharge capacity}} \times 100 \quad \text{(Equation 1)}$$

11. The method of claim 9, wherein the solvent supply amount is calculated as approximately 100% to approximately 150% of an amount of electrolyte having already been filled into the battery pack.

12. The method of claim 9, wherein
the electrolyte supply amount is calculated by using Equation 2 below such that an amount of gas discharged to the outside of the battery pack is measured, and
on the basis of the measured amount of gas, an amount (A) of electrolyte which has been already injected and converted into a reaction by-product due to a chemical reaction with an electrode assembly, is calculated $$\text{Electrolyte supply amount (ml)} = \text{Already filled electrolyte amount (ml)} - A \text{ (ml)}. \quad \text{(Equation 2)}$$

* * * * *